(12) United States Patent
Yin et al.

(10) Patent No.: US 11,070,757 B2
(45) Date of Patent: Jul. 20, 2021

(54) IMAGE SENSOR WITH DISTANCE SENSING FUNCTION AND OPERATING METHOD THEREOF

(71) Applicant: Guangzhou Tyrafos Semiconductor Technologies Co., LTD, Guangzhou (CN)

(72) Inventors: Ping-Hung Yin, Taipei (TW); Jia-Shyang Wang, Miaoli County (TW); Teng-Chien Yu, Hsinchu (TW)

(73) Assignee: Guangzhou Tyrafos Semiconductor Technologies Co., LTD, Guangzhou (CN)

( * ) Notice: Subject to any disclaimer, the term of this patent is extended or adjusted under 35 U.S.C. 154(b) by 0 days.

(21) Appl. No.: 16/843,912

(22) Filed: Apr. 9, 2020

(65) Prior Publication Data

US 2020/0351462 A1   Nov. 5, 2020

Related U.S. Application Data

(60) Provisional application No. 62/842,448, filed on May 2, 2019.

(30) Foreign Application Priority Data

Jan. 15, 2020 (TW) ................................. 109101327

(51) Int. Cl.
*H04N 7/18* (2006.01)
*H04N 5/369* (2011.01)
(Continued)

(52) U.S. Cl.
CPC ....... *H04N 5/36965* (2018.08); *G01S 17/894* (2020.01); *H04N 5/3532* (2013.01); *H04N 5/378* (2013.01); *H04N 9/045* (2013.01)

(58) Field of Classification Search
CPC .. H04N 5/36965; H04N 5/378; H04N 5/3532; H04N 9/045; H04N 9/04553; G01S 17/894
(Continued)

(56) References Cited

U.S. PATENT DOCUMENTS

| | | | |
|---|---|---|---|
| 2007/0098388 A1* | 5/2007 | Turley | H04N 5/2353 396/111 |
| 2012/0105823 A1* | 5/2012 | Hardegger | H04N 5/36965 356/5.01 |

(Continued)

OTHER PUBLICATIONS

"Office Action of Taiwan Counterpart Application", dated Dec. 7, 2020, p. 1-p. 28.

*Primary Examiner* — Gims S Philippe
(74) *Attorney, Agent, or Firm* — JCIPRNET

(57) ABSTRACT

An image sensor with a distance sensing function and an operating method thereof are provided. The image sensor includes a pixel array, a cluster analog to digital converter readout circuit, and a column readout circuit. The pixel array includes a plurality of sub-pixel groups arranged in an array. The plurality of sub-pixel groups are spaced apart from each other by a circuit layout area. The cluster analog to digital converter readout circuit is disposed in the circuit layout area of the pixel array. A distance sensing pixel of each of the plurality of sub-pixel groups is configured to perform time-of-flight ranging. The column readout circuit is disposed adjacent to the pixel array. A plurality of image sensing pixels of each of plurality of the sub-pixel groups are configured to perform image sensing.

16 Claims, 2 Drawing Sheets

(51) Int. Cl.
*H04N 5/378* (2011.01)
*G01S 17/894* (2020.01)
*H04N 5/353* (2011.01)
*H04N 9/04* (2006.01)

(58) Field of Classification Search
USPC .......................................................... 348/135
See application file for complete search history.

(56) References Cited

U.S. PATENT DOCUMENTS

| | | |
|---|---|---|
| 2016/0086318 A1 | 3/2016 | Hannuksela et al. |
| 2016/0225803 A1 | 8/2016 | Korobov et al. |
| 2016/0286108 A1 | 9/2016 | Fettig et al. |
| 2016/0353045 A1* | 12/2016 | Kawahito ......... H01L 27/14806 |
| 2017/0123067 A1 | 5/2017 | Van Der Tempel |
| 2017/0195574 A1* | 7/2017 | Wong ..................... H04N 5/378 |
| 2017/0315238 A1* | 11/2017 | Nagai ..................... G01S 17/89 |
| 2017/0370769 A1* | 12/2017 | Asano ............... H01L 27/14856 |
| 2018/0270438 A1* | 9/2018 | Niwa ................ H01L 27/14612 |
| 2018/0275255 A1* | 9/2018 | Yates ................... H04N 5/3745 |

\* cited by examiner

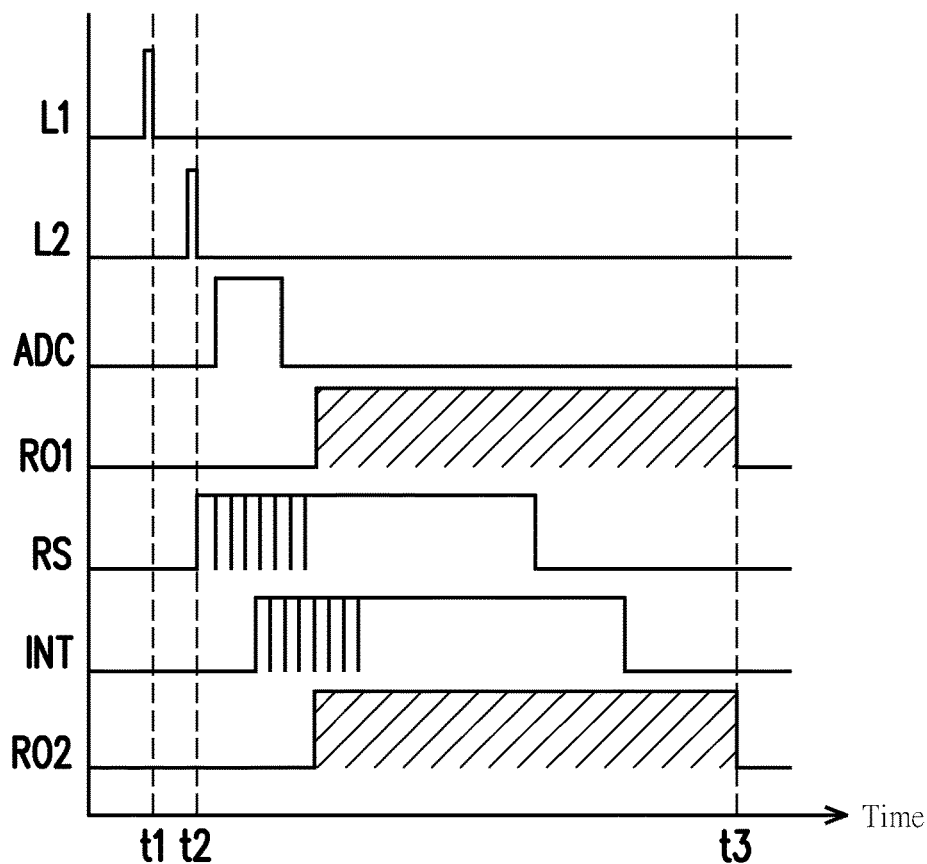

FIG. 3

```
┌─────────────────────────────────┐
│ Performing time-of-flight ranging by a │
│ distance sensing pixel of each of a plurality │
│ of sub-pixel groups in a pixel array and │
│ reading out a plurality of pieces of distance │──S410
│ sensing data of the sub-pixel groups by a │
│ cluster analog to digital converter readout │
│ circuit │
└─────────────────────────────────┘
                  ↓
┌─────────────────────────────────┐
│ Performing image sensing by a plurality of │
│ image sensing pixels of each of the sub-pixel │
│ groups and reading out a plurality of pieces │──S420
│ of image sensing data of the sub-pixel │
│ groups by a column readout circuit │
└─────────────────────────────────┘
```

FIG. 4

IMAGE SENSOR WITH DISTANCE SENSING FUNCTION AND OPERATING METHOD THEREOF

CROSS-REFERENCE TO RELATED APPLICATION

This application claims the priority benefits of U.S. provisional application Ser. No. 62/842,448, filed on May 2, 2019, and Taiwan application serial no. 109101327, filed on Jan. 15, 2020. The entirety of each of the above-mentioned patent applications is hereby incorporated by reference herein and made a part of this specification.

BACKGROUND

Technical Field

The disclosure relates to a sensor, and in particular, to an image sensor with a distance sensing function and an operating method thereof.

Description of Related Art

A general image sensor can only provide an image sensing function. Nevertheless, if distance (depth) information is required to be further sensed, an external distance sensor needs to be additionally installed on the image sensor. Although depth cameras have recently been developed, in an existing depth camera, a column readout circuit is separately used to read out image data and distance data of image sensing pixels and distance sensing pixels row by row in a rolling shutter manner. As such, an excessively long data readout time is required, and a sensitive sensing effect is not provided. In view of this, solutions of several embodiments are provided below.

SUMMARY

The disclosure provides an image sensor with a distance sensing function and an operating method thereof capable of setting the image sensor to effectively and quickly perform an image sensing function and a ranging function.

An image sensor with a distance sensing function of the disclosure includes a pixel array, a cluster analog to digital converter readout circuit, and a column readout circuit. The pixel array includes a plurality of sub-pixel groups arranged in an array. The plurality of sub-pixel groups are spaced apart from each other by a circuit layout area. The cluster analog to digital converter readout circuit is disposed in the circuit layout area of the pixel array and is coupled to a distance sensing pixel of each of the plurality of sub-pixel groups. The distance sensing pixel of each of the plurality of sub-pixel groups is configured to perform time-of-flight ranging. The column readout circuit is disposed adjacent to the pixel array and is coupled to a plurality of image sensing pixels of each of the plurality of sub-pixel groups. The plurality of image sensing pixels of each of the plurality of sub-pixel groups are configured to perform image sensing.

In an embodiment of the disclosure, the plurality of image sensing pixels include a red sub-pixel, a green sub-pixel, and a blue sub-pixel.

In an embodiment of the disclosure, the cluster analog to digital converter readout circuit is configured to perform a global shutter operation to simultaneously convert analog sensing data of the distance sensing pixel of each of the plurality of sub-pixel groups of the pixel array and read out a plurality of pieces of distance sensing data.

In an embodiment of the disclosure, the column readout circuit is configured to perform a rolling shutter operation to convert a plurality of pieces of analog image data of the image sensing pixels of each of the plurality of sub-pixel groups of the pixel array into a plurality of pieces of digital image data row by row and read out the digital image data row by row.

In an embodiment of the disclosure, the cluster analog to digital converter readout circuit and the column readout circuit complete readout of a plurality of pieces of distance sensing data and a plurality of pieces of digital image data in a same frame period.

In an embodiment of the disclosure, the cluster analog to digital converter readout circuit includes a plurality of analog to digital conversion units, and at least part of the distance sensing pixels of the plurality of sub-pixel groups share one analog to digital conversion unit.

In an embodiment of the disclosure, the column readout circuit includes a plurality of analog to digital conversion units, and the image sensing pixels of each column of the plurality of sub-pixel groups are coupled to one analog to digital conversion unit.

In an embodiment of the disclosure, the distance sensing pixel of each of the plurality of sub-pixel groups is configured to perform a time-of-flight ranging operation according to an indirect time-of-flight ranging method or a direct time-of-flight ranging method.

In an embodiment of the disclosure, the image sensor further includes a light emitting unit. The light emitting unit is configured to emit a sensing light to a sensing target, so that the distance sensing pixel of each of the plurality of sub-pixel groups receives a reflected light. The cluster analog to digital converter readout circuit respectively reads out a sensing result of the reflected light of the distance sensing pixel of each of the plurality of sub-pixel groups to output corresponding distance sensing data.

An operating method of the disclosure is adapted to an image sensor with a distance sensing function. The operating method includes the following steps. Time-of-flight ranging is performed by using a distance sensing pixel of each of a plurality of sub-pixel groups in a pixel array, and a plurality of pieces of distance sensing data of the plurality of sub-pixel groups are read out by using a cluster analog to digital converter readout circuit. Image sensing is performed by using a plurality of image sensing pixels of each of the plurality of sub-pixel groups, and a plurality of pieces of digital image data of the plurality of sub-pixel groups are read out by using a column readout circuit. The cluster analog to digital converter readout circuit is disposed in a circuit layout area of the pixel array. The column readout circuit is disposed adjacent to the pixel array.

Based on the above, in the image sensor with the distance sensing function and the operating method thereof of the disclosure, part of the sensing pixels in the pixel array of the image sensor are treated as distance sensing pixels, so that a ranging function is provided. Moreover, the cluster analog to digital converter readout circuit is additionally disposed in the circuit layout area of the pixel array in the image sensor of the disclosure to read out distance sensing data of the distance sensing pixels, and different readout circuits are used for other image sensing pixels. Therefore, the image sensor of the disclosure can effectively and quickly perform the image sensing function and the ranging function.

To make the features and advantages of the disclosure clear and easy to understand, the following gives a detailed description of embodiments with reference to accompanying drawings.

BRIEF DESCRIPTION OF THE DRAWINGS

FIG. 3 is a sequence diagram of an image sensor performing time-of-flight ranging and image sensing according to an embodiment of the disclosure.

FIG. 4 is a flow chart of an operating method according to an embodiment of the disclosure.

DESCRIPTION OF THE EMBODIMENTS

Figure 1:
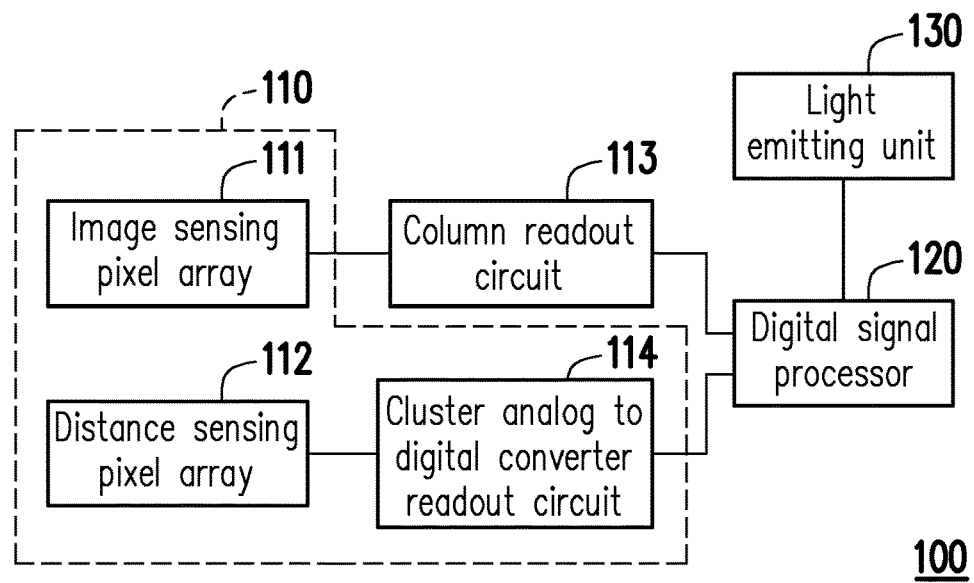
FIG. 1 is a schematic diagram of an image sensor with a distance sensing function according to an embodiment of the disclosure.

To make the content of the disclosure more comprehensible, embodiments are described below as examples according to which the disclosure can indeed be implemented. Wherever possible, the same reference numbers are used in the drawings and the description to refer to the same or similar elements, components or steps.

FIG. 1 is a schematic diagram of an image sensor with a distance sensing function according to an embodiment of the disclosure. Referring to FIG. 1, an image sensor 100 includes a pixel array 110, a column readout circuit 113, a digital signal processor (DSP) 120, and a light emitting unit 130. The pixel array 110 may be disposed on a substrate and includes an image sensing pixel array 111, a distance sensing pixel array 112, and a cluster analog to digital converter readout circuit (cluster ADC readout circuit) 114. In the present embodiment, the image sensing pixel array 111 and the distance sensing pixel array 112 form a plurality of sub-pixel groups arranged in an array, and the plurality of sub-pixel groups are spaced apart from each other by a circuit layout area. In the present embodiment, the cluster analog to digital converter readout circuit 114 is disposed in the circuit layout area in the substrate of the pixel array 110 in process integration and layout design manners, to be distinguished from the external column readout circuit 113.

In the present embodiment, the column readout circuit 113 is disposed adjacent to the pixel array 110 and is coupled to a plurality of image sensing pixels of the image sensing pixel array 111, where the plurality of image sensing pixels are configured to perform image sensing. The column readout circuit 113 may include a plurality of analog to digital converters. The cluster analog to digital converter readout circuit 114 is coupled to a plurality of distance sensing pixels of the distance sensing pixel array 112, where the plurality of distance sensing pixels are configured to perform distance sensing. In the present embodiment, the column readout circuit 113 and the cluster analog to digital converter readout circuit 114 are respectively configured to read out digital image data and distance sensing data to the DSP 120.

In the present embodiment, the plurality of distance sensing pixels of the distance sensing pixel array 112 may perform ranging by using, for example, a direct time-of-flight (D-ToF) ranging method or an indirect time-of-flight (I-ToF) ranging method manner, which is not limited in the disclosure. When the image sensor 100 performs ranging, the light emitting unit 130 may emit a sensing light to a sensing target, so that the plurality of distance sensing pixels of the distance sensing pixel array 112 may receive a corresponding reflected light, and the DSP 120 may perform corresponding computation to obtain distance information (or depth information). In addition, the light emitting unit 130 may be a light emitting diode (LED) or a laser diode (LD), which is not limited in the disclosure. In an embodiment, the light emitting unit 130 may also be disposed outside the image sensor 100. Therefore, the image sensor 100 of the present embodiment may simultaneously perform a time-of-flight ranging function and an image sensing function.

Figure 2:
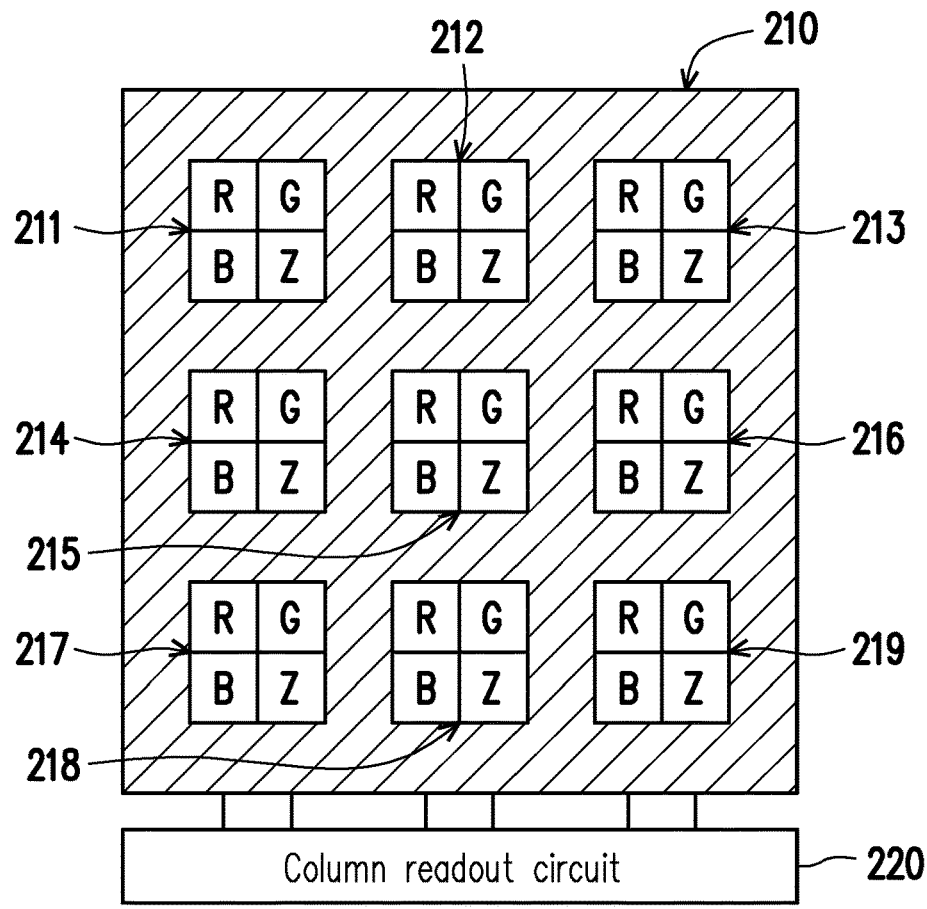
FIG. 2 is a schematic diagram of a pixel array according to an embodiment of the disclosure.

FIG. 2 is a schematic diagram of a pixel array according to an embodiment of the disclosure. Referring to FIG. 2, a pixel array 210 includes a plurality of sub-pixel groups 211 to 219 arranged in an array, and each of the sub-pixel groups 211 to 219 includes a plurality of sensing pixels (sub-pixels). The sub-pixel groups 211 to 219 are spaced apart from each other by a circuit layout area (the slant line area). In the present embodiment, the cluster analog to digital converter readout circuit (not shown in the figure) is disposed in the circuit layout area (the slant line area) of the pixel array 210 and is coupled to a distance sensing pixel Z of each of the sub-pixel groups 211 to 219. The plurality of distance sensing pixels Z of the sub-pixel groups 211 to 219 form a distance sensing pixel array. The distance sensing pixel Z of each of the sub-pixel groups 211 to 219 is configured to perform time-of-flight ranging. In the present embodiment, the column readout circuit 220 is disposed adjacent to the pixel array 210 and is coupled to a plurality of image sensing pixels of each of the sub-pixel groups 211 to 219. The plurality of image sensing pixels of the sub-pixel groups 211 to 219 form an image sensing pixel array. The plurality of image sensing pixels of each of the sub-pixel groups 211 to 219 are configured to perform image sensing. The plurality of image sensing pixels include a red sub-pixel R, a green sub-pixel G, and a blue sub-pixel B.

In the present embodiment, the cluster analog to digital converter readout circuit may include a plurality of analog to digital conversion units, and at least part of the distance sensing pixels Z of the sub-pixel groups 211 to 219 share one analog to digital conversion unit. For example, the distance sensing pixels Z of every four sub-pixel groups (for example, the sub-pixel groups 211 to 214) may share one analog to digital conversion unit, but the disclosure is not limited thereto. In the present embodiment, the column readout circuit 220 may include a plurality of analog to digital conversion units, and image sensing pixels of each column of the sub-pixel groups 211 to 219 are coupled to one analog to digital conversion unit. In other words, the distance sensing pixels Z and the image sensing pixels of the sub-pixel groups 211 to 219 of the present embodiment read out data by using different readout circuits. Therefore, the distance sensing pixels Z and the image sensing pixels may simultaneously perform distance sensing and image sensing. In addition, it should be noted that, an arrangement manner and a number of the sub-pixel groups 211 to 219 in FIG. 2 are only used for exemplary description, but the disclosure is not limited thereto.

FIG. 3 is a sequence diagram of an image sensor performing time-of-flight ranging and image sensing according to an embodiment of the disclosure. Referring to FIG. 1 and FIG. 3, in the present embodiment, the cluster analog to digital converter readout circuit 114 and the column readout circuit 113 complete readout of a plurality of pieces of distance sensing data and a plurality of pieces of digital image data in a same frame period. Specifically, a time interval of a time point t1 to a time point t3 in FIG. 3 is a frame period. Regarding distance sensing, for example, in a time sequence L1, the light emitting unit 130 emits a sensing light to a sensing target at the time point t1. For example, in a time sequence L2, the distance sensing pixel array 112 receives a reflected light from the sensing target at a time point t2. For example, in a time sequence ADC, the cluster analog to digital converter readout circuit 114 performs a global shutter operation, so as to simultaneously convert a plurality of pieces of analog sensing data of the plurality of distance sensing pixels of the distance sensing pixel array 112 of the pixel array 110 after the time point t2. For example, in a time sequence RO1, the cluster analog to digital converter readout circuit 114 continuously outputs a plurality of pieces of distance sensing data (the slant line section), and output of the plurality of pieces of distance sensing data is completed before the time point t3.

Regarding image sensing, for example, in a time sequence RS, the column readout circuit 113 performs a rolling shutter operation, and a resetting operation to be performed on the plurality of image sensing pixels of the image sensing pixel array 111 of the pixel array 110 row by row starts from the time point t2. Next, in a time sequence INT, after the plurality of image sensing pixels of the image sensing pixel array 111 of the pixel array 110 are reset, an exposure operation (image integral operation) is performed on these image sensing pixels row by row. For example, in a time sequence RO2, the column readout circuit 113 continuously outputs a plurality of pieces of digital image data (the slant line section), and the output of the plurality of pieces of digital image data is completed before the time point t3. Accordingly, the cluster analog to digital converter readout circuit 114 and the column readout circuit 113 of the present embodiment may complete the readout of the plurality of pieces of distance sensing data and the plurality of pieces of digital image data in the same frame period.

In another embodiment, the sensing light sent by the light emitting unit 130 may have, for example, a 940 nm wavelength. Therefore, the plurality of distance sensing pixels of the distance sensing pixel array 112 are configured to sense a light with a 940 nm wavelength. However, the plurality of image sensing pixels of the image sensing pixel array 111 are configured to sense a light in a visible light band of 400 nm to 700 nm. That is, the plurality of image sensing pixels of the image sensing pixel array 111 and the plurality of distance sensing pixels of the distance sensing pixel array 112 do not interfere with each other. Therefore, in another embodiment, a resetting action of the time sequence RS may be advanced from the time point t2 to t1, and an exposure action and a readout action of the time sequences INT and RO2 may also be advanced.

FIG. 4 is a flow chart of an operating method according to an embodiment of the disclosure. Referring to FIG. 1 and FIG. 4, an operating method of the present embodiment may be adapted to the image sensor 100 in the embodiment of FIG. 1. In step S410, the distance sensing pixel (the distance sensing pixel array 112) of each of the plurality of sub-pixel groups in the pixel array 110 performs time-of-flight ranging, and the cluster analog to digital converter readout circuit 114 reads out a plurality of pieces of distance sensing data of the plurality of sub-pixel groups. In step S420, the plurality of image sensing pixels (the image sensing pixel array 111) of each of the plurality of sub-pixel groups perform image sensing, and the column readout circuit 113 reads out a plurality of pieces of image sensing data (digital image data) of the plurality of sub-pixel groups. Therefore, the operating method of the present embodiment may make the image sensor 100 perform image sensing and ranging simultaneously.

In addition, for other element features, implementation details, and technical features of the image sensor 100 of the present embodiment, reference may be made to the content of the embodiments of the above FIG. 1 to FIG. 3 to obtain sufficient teachings, suggestions and implementation descriptions. Therefore, details are not described herein again.

Based on the above, in the image sensor with the distance sensing function and the operating method thereof provided by the disclosure, part of the sensing pixels in the pixel array may be treated as distance sensing pixels, so that the pixel array may provide an image sensing function and a ranging function. Moreover, in the image sensor of the disclosure, the cluster analog to digital converter readout circuit may be disposed in the circuit layout area of the pixel array to read out distance sensing data of the distance sensing pixels. Therefore, because digital image data of the image sensing pixel is executed separately by the column readout circuit, the image sensor of the disclosure can achieve the effect of simultaneously performing the image sensing function and the ranging function.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. An image sensor with a distance sensing function, comprising:
   a pixel array, comprising a plurality of sub-pixel groups arranged in an array, wherein the sub-pixel groups are spaced apart from each other by a circuit layout area;
   a cluster analog to digital converter readout circuit, disposed in the circuit layout area of the pixel array, coupled to a distance sensing pixel of each of the sub-pixel groups, wherein the distance sensing pixel of each of the sub-pixel groups is configured to perform time-of-flight ranging; and
   a column readout circuit, disposed adjacent to the pixel array, coupled to a plurality of image sensing pixels of each of the sub-pixel groups, wherein the image sensing pixels of each of the sub-pixel groups are configured to perform image sensing,
   wherein the cluster analog to digital converter readout circuit completes a readout of a plurality of pieces of distance sensing data and the column readout circuit completes a readout of a plurality of pieces of digital image data in a same frame period.

2. The image sensor according to claim 1, wherein the image sensing pixels comprise a red sub-pixel, a green sub-pixel, and a blue sub-pixel.

3. The image sensor according to claim 1, wherein the cluster analog to digital converter readout circuit is configured to perform a global shutter operation to simultaneously convert analog sensing data of the distance sensing pixel of each of the sub-pixel groups of the pixel array and read out the plurality of pieces of distance sensing data.

4. The image sensor according to claim 1, wherein the column readout circuit is configured to perform a rolling shutter operation to convert a plurality of pieces of analog image data of the image sensing pixels of each of the sub-pixel groups of the pixel array into a plurality of pieces of digital image data row by row and read out the pieces of digital image data row by row.

5. The image sensor according to claim 1, wherein the cluster analog to digital converter readout circuit comprises a plurality of analog to digital conversion units, and at least part of the distance sensing pixels of the sub-pixel groups share one analog to digital conversion unit.

6. The image sensor according to claim 1, wherein the column readout circuit comprises a plurality of analog to digital conversion units, and the image sensing pixels of each column of the sub-pixel groups are coupled to one analog to digital conversion unit.

7. The image sensor according to claim 1, wherein the distance sensing pixel of each of the sub-pixel groups is configured to perform a time-of-flight ranging operation according to an indirect time-of-flight ranging method or a direct time-of-flight ranging method.

8. The image sensor according to claim 1, further comprising:
a light emitting unit, configured to emit a sensing light to a sensing target, so that the distance sensing pixel of each of the sub-pixel groups receives a reflected light, wherein the cluster analog to digital converter readout circuit respectively reads out a sensing result of the reflected light of the distance sensing pixel of each of the sub-pixel groups to output corresponding distance sensing data.

9. An operating method, adapted to an image sensor with a distance sensing function, wherein the operating method comprises:
performing time-of-flight ranging by using a distance sensing pixel of each of a plurality of sub-pixel groups in a pixel array and reading out a plurality of pieces of distance sensing data of the sub-pixel groups by using a cluster analog to digital converter readout circuit; and
performing image sensing by using a plurality of image sensing pixels of each of the sub-pixel groups and reading out a plurality of pieces of digital image data of the sub-pixel groups by using a column readout circuit,
wherein the cluster analog to digital converter readout circuit is disposed in a circuit layout area of the pixel array, and the column readout circuit is disposed adjacent to the pixel array,
wherein the step of reading out the plurality of pieces of distance sensing data by the cluster analog to digital converter readout circuit and the step of reading out the plurality of pieces of digital image data by the column readout circuit are completed in a same frame period.

10. The operating method according to claim 9, wherein the image sensing pixels comprise a red sub-pixel, a green sub-pixel, and a blue sub-pixel.

11. The operating method according to claim 9, wherein the cluster analog to digital converter readout circuit is configured to perform a global shutter operation to simultaneously convert analog sensing data of the distance sensing pixel of each of the sub-pixel groups of the pixel array and read out the distance sensing data.

12. The operating method according to claim 9, wherein the column readout circuit is configured to perform a rolling shutter operation to convert a plurality of pieces of analog image data of the image sensing pixels of each of the sub-pixel groups of the pixel array into the plurality of pieces of digital image data row by row and read out the plurality of pieces of digital image data row by row.

13. The operating method according to claim 9, wherein the cluster analog to digital converter readout circuit comprises a plurality of analog to digital conversion units, and at least part of the distance sensing pixels of the sub-pixel groups share one analog to digital conversion unit.

14. The operating method according to claim 9, wherein the column readout circuit comprises a plurality of analog to digital conversion units, and the image sensing pixels of each column of the sub-pixel groups are coupled to one analog to digital conversion unit.

15. The operating method according to claim 9, wherein the distance sensing pixel of each of the sub-pixel groups is configured to perform a time-of-flight ranging operation according to an indirect time-of-flight ranging method or a direct time-of-flight ranging method.

16. The operating method according to claim 9, wherein the step of reading out the distance sensing data of the sub-pixel groups by using the cluster analog to digital converter readout circuit comprises:
emitting a sensing light to a sensing target by using a light emitting unit, so that the distance sensing pixel of each of the sub-pixel groups receives a reflected light; and
respectively reading out a sensing result of the reflected light of the distance sensing pixel of each of the sub-pixel groups by using the cluster analog to digital converter readout circuit to output corresponding distance sensing data.

* * * * *